United States Patent
Tang

(10) Patent No.: US 10,893,522 B2
(45) Date of Patent: Jan. 12, 2021

(54) WIRELESS COMMUNICATION METHOD, DEVICE AND STORAGE MEDIUM

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 15/999,288

(22) Filed: Aug. 16, 2018

(65) Prior Publication Data
US 2019/0075561 A1 Mar. 7, 2019

Related U.S. Application Data

(63) Continuation of application No. PCT/CN2016/079455, filed on Apr. 15, 2016.

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0048* (2013.01); *H04L 5/0053* (2013.01);
(Continued)

(58) Field of Classification Search
CPC ......... H04W 72/0446; H04W 72/0453; H04W 72/0406; H04W 72/04; H04L 27/2607;
(Continued)

(56) References Cited

U.S. PATENT DOCUMENTS

2007/0140166 A1 6/2007 Eichinger
2008/0225783 A1* 9/2008 Wang .................. H04W 72/042
370/329
(Continued)

FOREIGN PATENT DOCUMENTS

CN 101778392 A 7/2010
CN 102917328 A 2/2013
(Continued)

OTHER PUBLICATIONS

International Search Report in international application No. PCT/CN2016/079455, dated Jan. 11, 2017.
(Continued)

*Primary Examiner* — Pao Sinkantarakorn
*Assistant Examiner* — Kabir U Jahangir
(74) *Attorney, Agent, or Firm* — Ladas & Parry LLP

(57) ABSTRACT

A wireless communication method, device and storage medium are provided. The method includes that resource configuration information is received, the resource configuration information is configured to determine multiple resource units divided in the frequency and the time of a specific carrier and type information of each resource unit, the type information of each resource unit indicates that the resource unit is one of an uplink resource unit, a downlink resource unit, or a protection resource unit; and communication is performed on the particular carrier based on the resource configuration information.

18 Claims, 5 Drawing Sheets

(51) Int. Cl.
*H04L 5/14* (2006.01)
*H04L 25/02* (2006.01)
*H04L 27/26* (2006.01)

(52) U.S. Cl.
CPC .......... *H04L 5/0055* (2013.01); *H04L 5/0091* (2013.01); *H04L 5/1469* (2013.01); *H04L 25/0224* (2013.01); *H04L 27/2607* (2013.01); *H04W 72/04* (2013.01); *H04W 72/0406* (2013.01); *H04W 72/0453* (2013.01)

(58) Field of Classification Search
CPC . H04L 25/0224; H04L 5/0048; H04L 5/0055; H04L 5/0053; H04L 5/1469; H04L 5/0091
See application file for complete search history.

(56) References Cited

U.S. PATENT DOCUMENTS

| | | | |
|---|---|---|---|
| 2014/0056186 A1 | 2/2014 | Gao et al. | |
| 2016/0007374 A1* | 1/2016 | Lee | H04J 11/00 370/336 |
| 2016/0269226 A1 | 9/2016 | Zeng et al. | |
| 2017/0201968 A1* | 7/2017 | Nam | H04W 72/042 |
| 2017/0310435 A1 | 10/2017 | Wei et al. | |

FOREIGN PATENT DOCUMENTS

| | | |
|---|---|---|
| CN | 104067688 A | 9/2014 |
| CN | 104469950 A | 3/2015 |
| CN | 104640214 A | 5/2015 |
| CN | 104854801 A | 8/2015 |
| JP | 2014216697 A | 11/2014 |
| JP | 2015130686 A | 7/2015 |
| JP | 2015531220 A | 10/2015 |
| JP | 2016500964 A | 1/2016 |
| JP | 2016505227 A | 2/2016 |
| JP | 2017527221 A | 9/2017 |
| TW | 201613399 A | 4/2016 |
| WO | 2012149573 A1 | 11/2012 |
| WO | 2012149673 A1 | 11/2012 |
| WO | 2015122732 A1 | 8/2015 |
| WO | 2016037516 A1 | 3/2016 |
| WO | 2016037305 A1 | 6/2016 |

OTHER PUBLICATIONS

Written Opinion of the International Search Authority in international application No. PCT/CN2016/079455, dated Jan. 11, 2017.
Supplementary European Search Report in the European application 16898259.2, dated Feb. 4, 2019.
Fujitsu: "On frame structure for New RAT",3GPP Draft; RI-162335 Frame Structure Final, 3rd Generation Partnership Project (3GPP), Mobile Competence Centre ; 650, Route Des Lucioles ; F-06921 Sophia-Anti Polis Cedex ; France, vol. RAN WG1, No. Busan, Korea; Apr. 11, 2016-Apr. 15, 2016 Apr. 1, 2016 (Apr. 1, 2016), XP051079553,[retrieved on Apr. 1, 2016] *section 3.2*.
English Translation of the Written Opinion of the International Search Authority in the international application No. PCT/CN2016/079455, dated Jan. 11, 2017.
International Search Report in international application No. PCT/CN2016/0794155, dated Jan. 11, 2017.
First Office Action of the Japanese application No. 2018-550761, dated Dec. 20, 2019.
First Office Action of the Chinese application No. 201680083572.8, dated Mar. 9, 2020.
Huawei, HiSilicon, "Overview of 5G frame Structure", 3GPP TSG RAN WG1 Meeting #84bis R1-162157, issued on Apr. 1, 2016, the whole document.
Huawei, HiSilicon, WF on Forward Compatibility, 3GPP TSG RAN WG1 #84bis R1-163555 Busan, Korea Apr. 11-15, 2016, pp. 1-4.
First Office Action of the Indian application No. 201817041948, dated Jul. 6, 2020.
Second Office Action of the European application No. 16898269.2, dated Jul. 15, 2020.

\* cited by examiner

WIRELESS COMMUNICATION METHOD, DEVICE AND STORAGE MEDIUM

CROSS-REFERENCE TO RELATED APPLICATION

This is a continuation application of PCT Application No. PCT/CN2016/079455 filed on Apr. 15, 2016, the disclosure of which is incorporated by reference herein in their entireties.

TECHNICAL FIELD

The disclosure relates to wireless communications, and particularly to a wireless communication method and device adopting a novel frame structure.

BACKGROUND

Wireless communication networks are widely deployed to provide various kinds of communication services such as voice, video, packet data, message transmission and broadcast service. These wireless communication networks may be multiple access networks capable of supporting multiple users by sharing available network resources. Examples of such multiple access networks include Code Division Multiple Access (CDMA) networks, Time Division Multiple Access (TDMA) networks, Frequency Division Multiple Access (FDMA) networks, Orthogonal FDMA (OFDMA) networks and Single Carrier-FDMA (SC-FDMA) networks.

In a $5^{th}$-Generation (5G) mobile communication system under discussion, a high frequency band (a carrier frequency is 6 Hz-100 GHz) will be an important deployment scenario. For the high frequency band, Time Division Duplex (TDD) using the same frequency band for uplink and downlink is a more appropriate duplex mode. At present, a Long Term Evolution (LTE) TDD system mainly adopts 7 kinds of TDD configurations, as illustrated in Table 1, a duration of each subframe is 1 ms, D represents a downlink subframe, U represents an uplink sub frame and S represent a special subframe.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 1 is a schematic diagram of a radio frame structure of an LTE TDD system, in which a special subframe includes a Downlink Pilot Time Slot (DwPTS), a Guard Period (GP) configured for a handover from downlink to uplink, and an Uplink Pilot Time Slot (UpPTS).

Since a 5G system will be deployed mainly in a high frequency band, a coverage range of a cell in the 5G system will be greatly reduced compared with $4^{th}$-Generation (4G) and $3^{rd}$-Generation (3G) systems. When a cell coverage range becomes smaller, the number of users per cell will also be correspondingly reduced, and thus data traffic of the cell may also change more rapidly as the services change. For adaptation to rapid changes in the data traffic of the cell, the 5G system may adopt the same configuration manner as the LTE TDD system, that is, may adapt changes in uplink and downlink data traffic by switching 7 kinds of TDD configurations. However, the existing configurations of the LTE TDD system cannot meet rapid dynamic change requirements of the data traffic in the 5G system.

In addition, unlike a related mobile communication system such as an LTE system, which is mainly Mobile Broadband (MBB), a 5G system will support multiple services with greatly different requirements, including at least Enhanced MBB (eMBB), Ultra Reliable Low-Latency Communication (URLLC) or Massive Machine Type Communication (mMTC). These services have different or even greatly different requirements for key indexes such as rate, delay, transmission reliability and power consumption/energy efficiency (waveform), so that the 5G system is required to be flexible enough to meet different service requirements.

Moreover, since a frequency bandwidth of a 5G system is relatively wide and a bandwidth of a single carrier may reach 100 MHz and even more, if the 5G system uses the same uplink and downlink proportion design on the whole carrier as the LTE TDD, great constraints and possible waste will be brought. If different uplink and downlink proportions are used in the same TTD carrier deployed in the same geographic region or adjacent TDD carriers in a frequency domain deployed in adjacent geographic regions, such as a TAD configuration illustrated in FIG. 1, an uplink subframe and a downlink subframe indicated by the same subframe number may bring strong uplink and downlink interference on the whole carrier bandwidth, thereby reducing a system capability and even making the carrier in part of the region unavailable.

Therefore, a 5G system is required to efficiently support multiple uplink and downlink proportions in the same carrier and between adjacent carriers in the frequency domain, so as to more flexibly adapt to rapid changes in data traffic of a cell and solve or alleviate the corresponding interference problem.

SUMMARY

Embodiments of the disclosure provide a wireless communication method, device and storage medium.

According to a first aspect of the disclosure, a wireless communication method is provided, which may include that resource configuration information is received, the resource configuration information is configured to determine multiple resource units divided in frequency and time of a specific carrier and type information of each resource unit, here the type information of each resource unit may indicate that the resource unit is one of an uplink resource unit, a downlink resource unit, or a protection resource unit; and communication is performed on the carrier based on the resource configuration information.

According to a second aspect of the disclosure, a wireless communication method is provided, which may include that resource configuration information is determined, the resource configuration information is configured to determine multiple resource units divided in frequency and time of a specific carrier and type information of each resource unit, here the type information of each resource unit may indicate that the resource unit is one of an uplink resource unit, a downlink resource unit, or a protection resource unit; and the resource configuration information is sent for communication on the carnet.

According to a third aspect of the disclosure, a wireless communication device is provided, which may include that a receiving unit, configured to receive resource configuration information; and a processing unit, configured to determine multiple resource units divided in frequency and time of a specific carrier and type information of each resource unit according to the resource configuration information, here the type information of each resource unit may indicate that the resource unit is one of an uplink resource unit, a downlink resource unit, or a protection resource unit, and to perform communication on the carrier based on the resource configuration information.

According to a fourth aspect of the disclosure, a wireless communication device is provided, which may include that a processing unit, configured to determine resource configuration information, the resource configuration information is configured to determine multiple resource units divided in frequency and time of a specific carrier and type information of each resource unit, here the type information of each resource unit may indicate that the resource unit is one of an uplink resource unit, a downlink resource unit, or a protection resource unit; and a sending unit, configured to send the resource configuration information.

According to a fifth aspect of the disclosure, a wireless communication device is provided, which may include a processor and a memory storing a computer program that when executed by the processor, cause the processor to receive resource configuration information, the resource configuration information is configured to determine multiple resource units divided in frequency and time of a specific carrier and type information of each resource unit, here the type information of each resource unit may indicate that the resource unit is one of an uplink resource unit, a downlink resource unit, or a protection resource unit; and to perform communication on the carrier based on the resource configuration information.

According to a sixth aspect of the disclosure, a non-transitory computer-readable storage medium is provided, which have stored thereon instructions that when executed by a processors, cause the processor to implement the wireless communication method recited in each embodiment of the disclosure.

According to a seventh aspect of the disclosure, a computer program product is provided, which may include a non-transitory computer-readable medium having stored thereon a set of instructions that executed by a processor, cause the processor to implement the wireless communication method recited in each embodiment of the disclosure.

BRIEF DESCRIPTION OF DRAWINGS

The abovementioned and other features, characteristics, advantages and benefits of the disclosure will become more apparent through the following detailed descriptions made in combination with the drawings.

Figure 1:
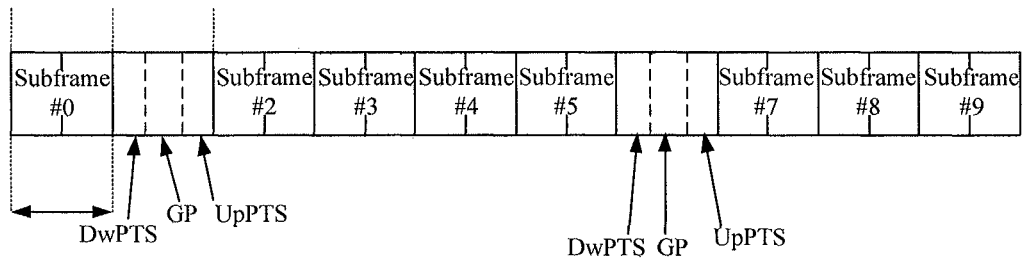
FIG. 1 is a schematic diagram of a radio frame structure of a related LTE system.

In all of the drawings, the same drawing reference signs represent similar or corresponding characteristics or functions.

DETAILED DESCRIPTION

In order to make the solutions of the present disclosure better understood by those skilled in the art, the technical solutions in the embodiments of the present disclosure will be clearly and completely described below in combination with the drawings in the embodiments of the present disclosure.

The embodiments of the disclosure provide a wireless communication method, device, and storage medium.

At least some embodiments of the disclosure provide a wireless communication method, the method comprises: receiving resource configuration information, the resource configuration information being configured to determine a plurality of resource units divided in frequency and time of a specific carrier and type information of each resource unit, wherein the type information of each resource unit indicates that the resource unit is one of an uplink resource unit, a downlink resource unit, or a protection resource unit; and performing communication on the carrier based on the resource configuration information.

According to at least some embodiments, the resource configuration information at least comprises parameters associated with each of one or more resource units, that serve as an uplink resource unit or a downlink resource unit, of the plurality of resource units, and the parameters comprise at least one of: a time span; a frequency span; a subcarrier spacing; a total number of subcarriers; a Cyclic Prefix (CP) length; whether a downlink measurement Reference Signal (RS) is present; configuration information of a downlink measurement RS; whether to support a transmission of an uplink Sounding Reference Signal (SRS); configuration information of an SRS; whether to support a transmission of a Physical Uplink Control Channel (PUCCH); configuration information of a PUCCH; whether to support a transmission of a Physical Downlink Control Channel (PDCCH) or an Enhanced PDCCH (EPDCCH); or configuration information of a PDCCH/EPDCCH.

According to at least some embodiments, time spans of at least part of the plurality of resource units are different from time spans of other resource units of the plurality of resource units and/or frequency spans of at least part of the plurality of resource units are different from frequency spans of other resource units of the plurality of resource units, or time spans and frequency spans of the plurality of resource units are identical time spans and identical frequency spans.

According to at least some embodiments, the plurality of resource units comprise a first resource unit, a second resource unit and a third resource unit which are overlapped in time and not overlapped in frequency and which are consecutive or adjacent, wherein the first resource unit is an uplink resource unit, the second resource unit is a protection resource unit and the third resource unit is a downlink resource unit, or the first resource unit is a downlink resource unit, the second resource unit is a protection resource unit and the third resource unit is an uplink resource unit.

According to at least some embodiments, the plurality of resource units comprise a first resource unit, a second resource unit and a third resource unit which are overlapped in time and not overlapped in frequency and which are consecutive or adjacent, wherein the first resource unit and the third resource unit are both uplink resource units or both downlink resource units, and the second resource unit is a protection resource unit.

According to at least some embodiments, the second resource unit covers, in the time, an overlapping part of the first resource unit and the third resource unit in the time.

According to at least some embodiments, a frequency span of the second resource unit is determined according to characteristics of the first resource unit and the third resource unit.

According to at least some embodiments, the second resource unit is disposed between the first resource unit and the third resource unit based on parameters associated with the first resource unit and the third resource unit.

According to at least some embodiments, the protection resource unit is a resource unit transmitting no signals, or the protection resource unit is configured to transmit information configured to at least partially offset external radiation of the resource units.

According to at least some embodiments, at least one of type information of the plurality of resource units or parameters associated with the plurality of resource units is periodically repeated in time; or at least one of type information of the plurality of resource units or parameters associated with the plurality of resource units dynamically changes according to updated resource configuration information received; or at least one of type information of the plurality of resource units or parameters associated with the plurality of resource units is based on periodic repetition in time, and at least one of type information of at least part of the plurality of resource units or parameters associated with the at least part of the plurality of resource units dynamically changes during a specific time period according to updated resource configuration information received, and the at least one of type information of the plurality of resource units or parameters associated with the plurality of resource units that is based on the periodic repetition is resumed after the specific time period; or at least one of type information of the plurality of resource units or parameters associated with the plurality of resource units is based on periodic repetition in time, and at least one of type information of at least part of the plurality of resource units or parameters associated with the at least part of the plurality of resource units dynamically changes after a specific time point according to updated resource configuration information received.

According to at least some embodiments, the configuration information is received through at least one of System Information (SI), high-layer signaling, or Downlink Control Information (DCI).

According to at least some embodiments, the configuration information is obtained through the DCI received in a Common Search Space (CSS).

According to at least some embodiments, the method further comprises: receiving resource scheduling information, wherein the resource scheduling information indicates a first resource unit of the plurality of resource units which is configured for a terminal to receive or send data, and the resource scheduling information indicates a second resource unit of the plurality of resource units which is configured for the terminal to correspondingly send or receive Acknowledgement (ACK) information for the data, or indicates that ACK information for the data is not required.

According to at least some embodiments, the resource scheduling information indicates a numerical value, and the method further comprises: when the numerical value is not 0, determining a time position of the second resource unit based on a time position and a time offset of the first resource unit, wherein the time offset is equal to a product of a first unit time span and the numerical value; or when the numerical value is 0, determining that the ACK information for the data is not required.

According to at least some embodiments, the first unit time span is obtained in one of the following manners that the first unit time span is equal to a time span of the first resource unit; the first unit time span is implicitly determined according to a time span of the first resource unit; or the first unit time span is determined according to signaling sent by a base station.

At least some embodiments of the disclosure provide a wireless communication method, the method comprises: determining resource configuration information, the resource configuration information being configured to determine a plurality of resource units divided in frequency and time of a specific carrier and type information of each resource unit, wherein the type information of each resource unit indicates that the resource unit is one of an uplink resource unit, a downlink resource unit, or a protection resource unit; and sending the resource configuration information for communication on the carrier.

According to at least some embodiments, the resource configuration information at least comprises parameters associated with each of one or more resource units, that serve as an uplink resource unit or a downlink resource unit, of the plurality of resource units, the parameters comprise at least one of: a time span; a frequency span; a subcarrier spacing; a total number of subcarriers; a Cyclic Prefix (CP) length; whether a downlink measurement Reference Signal (RS) is present; configuration information of a downlink measurement RS; whether to support a transmission of an uplink Sounding Reference Signal (SRS); configuration information of an SRS; whether to support a transmission of a Physical Uplink Control Channel (PUCCH); configuration information of a PUCCH; whether to support a transmission of a Physical Downlink Control Channel (PDCCH) or an Enhanced PDCCH (EPDCCH); or configuration information of a PDCCH/EPDCCH.

According to at least some embodiments, time spans of at least part of the plurality of resource units are different from time spans of other resource units of the plurality of resource units and/or frequency spans of at least part of the plurality of resource units are different from frequency spans of other resource units of the plurality of resource units, or time spans and frequency spans of the plurality of resource units are identical time spans and identical frequency spans.

According to at least some embodiments, the plurality of resource units comprise a first resource unit, a second resource unit and a third resource unit which are overlapped in time and not overlapped in frequency and which are consecutive or adjacent, wherein the first resource unit is an uplink resource unit, the second resource unit is a protection resource unit and the third resource unit is a downlink resource unit, or the first resource unit is a downlink resource unit, the second resource unit is a protection resource unit and the third resource unit is an uplink resource unit.

According to at least some embodiments, the plurality of resource units comprise a first resource unit, a second resource unit and a third resource unit which are overlapped in time and not overlapped in frequency and which are consecutive or adjacent, wherein the first resource unit and the third resource unit are both uplink resource units or both downlink resource units, and the second resource unit is a protection resource unit.

According to at least some embodiments, the second resource unit covers, in the time, an overlapping part of the first resource unit and the third resource unit in the time.

According to at least some embodiments, a frequency span of the second resource unit is determined according to characteristics of the first resource unit and the third resource unit.

According to at least some embodiments, the frequency span of the second resource unit is determined according to a communication parameter of one of the first resource unit and the third resource unit that serves as an interfering party, and a performance requirement of the other of the first resource unit and the third resource unit that serves as an interfered party.

According to at least some embodiments, the second resource unit is disposed between the first resource unit and the third resource unit at least partially according to parameters associated with the first resource unit being different from parameters associated with the third resource unit.

According to at least some embodiments, the second resource unit is disposed between the first resource unit and the third resource unit at least partially according to a subcarrier spacing of the first resource unit being different from a subcarrier spacing of the third resource unit.

According to at least some embodiments, the protection resource unit is a resource unit transmitting no signals, or the protection resource unit is configured to transmit information configured to at least partially offset external radiation of the resource units.

According to at least some embodiments, the method further comprises: repeatedly sending the resource configuration information; or sending updated resource configuration information, the updated resource configuration information being configured to determine at least one of dynamically changing type information of the plurality of resource units or dynamically changing parameters associated with the plurality of resource units; or sending updated resource configuration information, the updated resource configuration information being configured to determine at least one of dynamically changing type information of the plurality of resource units or dynamically changing parameters associated with the plurality of resource units, and the at least one of dynamically changing type information of the plurality of resource units or dynamically changing parameters associated with the plurality of resource units being valid during a specific time period; or sending updated resource configuration information, the updated resource configuration information being configured to determine at least one of dynamically changing type information of the plurality of resource units or dynamically changing parameters associated with the plurality of resource units, and at least one of type information of the plurality of resource units or parameters associated with the plurality of resource units dynamically changes according to the updated resource configuration information after a specific time point.

According to at least some embodiments, the configuration information is sent through at least one of System Information (SI), high-layer signaling, or Downlink Control Information (DCI).

According to at least some embodiments, the configuration information is obtained through the DCI sent in a Common Search Space (CSS).

According to at least some embodiments, the method further comprises: sending resource scheduling information, wherein the resource scheduling information indicates a first resource unit of the plurality of resource units which is configured for a terminal to receive or send data, and the resource scheduling information indicates a second resource unit of the plurality of resource units which is configured for the terminal to correspondingly send or receive Acknowledgement (ACK) information for the data, or indicates that ACK information for the data is not required.

According to at least some embodiments, the resource scheduling information indicates a numerical value, and the numerical value is configured to determine a time position of the second resource unit based on a first unit time span; or the numerical value is specified to be 0 to indicate that the ACK information for the data is not required.

According to at least some embodiments, the first unit time span is obtained in one of the following manners that: the first unit time span is equal to a time span of the first resource unit; the first unit time span is implicitly determined according to a time span of the first resource unit; or the first unit time span is determined according to signaling sent by a base station.

At least some embodiments of the disclosure provide a wireless communication device, which comprises: a receiving unit, configured to receive resource configuration information; and a processing unit, configured to determine a plurality of resource units divided in frequency and time of a specific carrier and type information of each resource unit according to the resource configuration information, wherein the type information of each resource unit indicates that the resource unit is one of an uplink resource unit, a downlink resource unit, or a protection resource unit, and perform communication on the carrier based on the resource configuration information.

According to at least some embodiments, the resource configuration information at least comprises parameters associated with each of one or more resource units, that serve as an uplink resource unit or a downlink resource unit, of the plurality of resource units, and the parameters comprise at least one of: a time span; a frequency span; a subcarrier spacing; a total number of subcarriers; a Cyclic Prefix (CP) length; whether a downlink measurement Reference Signal (RS) is present; configuration information of a downlink measurement RS; whether to support a transmission of an uplink Sounding Reference Signal (SRS); configuration information of an SRS; whether to support a transmission of a Physical Uplink Control Channel (PUCCH); configuration information of a PUCCH; whether to support a transmission of a Physical Downlink Control Channel (PDCCH) or an Enhanced PDCCH (EPDCCH); or configuration information of a PDCCH/EPDCCH.

According to at least some embodiments, time spans of at least part of the plurality of resource units are different from time spans of other resource units of the plurality of resource units and/or frequency spans of at least part of the plurality of resource units are different from frequency spans of other resource units of the plurality of resource units, or time spans and frequency spans of the plurality of resource units are identical time spans and identical frequency spans.

According to at least some embodiments, the plurality of resource units comprise a first resource unit, a second resource unit and a third resource unit which are overlapped in time and not overlapped in frequency and which are consecutive or adjacent, wherein the first resource unit is an uplink r resource unit, the second resource unit is a protection resource unit and the third resource unit is a downlink resource unit, or the first resource unit is a downlink resource unit, the second resource unit is a protection resource unit and the third resource unit is an uplink resource unit.

According to at least some embodiments, the plurality of resource units comprise a first resource unit, a second resource unit and a third resource unit which are overlapped in time and not overlapped in frequency and which are consecutive or adjacent, wherein the first resource unit and the third resource unit are both uplink resource units or both downlink resource units, and the second resource unit is a protection resource unit.

According to at least some embodiments, the second resource unit covers, in time, an overlapping part of the first resource unit and the third resource unit in the time.

According to at least some embodiments, a frequency span of the second resource unit is determined according to characteristics of the first resource unit and the third resource unit.

According to at least some embodiments, the second resource unit is disposed between the first resource unit and the third resource unit based on parameters associated with the first resource unit and the third resource unit.

According to at least some embodiments, the protection resource unit is a resource unit transmitting no signals, or the protection resource unit is configured to transmit information configured to at least partially offset external radiation of the resource units.

According to at least some embodiments, at least one of type information of the plurality of resource units or parameters associated with the plurality of resource units is periodically repeated in time; or at least one of type information of the plurality of resource units or parameters associated with the plurality of resource units dynamically changes according to updated resource configuration information received; or at least one of type information of the plurality of resource units or parameters associated with the plurality of resource units is based on periodic repetition in time, and at least one of type information of at least part of the plurality of resource units or parameters associated with the at least part of the plurality of resource units dynamically changes during a specific time period according to updated resource configuration information received, and the at least one of type information of the plurality of resource units or parameters associated with the plurality of resource units that is based on the periodic repetition is resumed after the specific time period; or at least one of type information of the plurality of resource units or parameters associated with the plurality of resource units is based on periodic repetition in time, and at least one of type information of at least part of the plurality of resource units or parameters associated with the at least part of the plurality of resource units dynamically changes after a specific time point according to updated resource configuration information received.

According to at least some embodiments, the configuration information is received through at least one of System Information (SI), high-layer signaling, or Downlink Control Information (DCI).

According to at least some embodiments, the configuration information is obtained through the DCI received in a Common Search Space (CSS).

According to at least some embodiments, the receiving unit receives resource scheduling information, wherein the resource scheduling information indicates a first resource unit of the plurality of resource units which is configured for a terminal to receive or send data, and the resource scheduling information indicates a second resource unit of the plurality of resource units which is configured for the terminal to correspondingly send or receive Acknowledgement (ACK) information for the data, or indicates that ACK information for the data is not required.

According to at least some embodiments, the resource scheduling information indicates a numerical value, and the processing unit is further configured to: when the numerical value is not 0, determine a time position of the second resource unit based on a time position and a time offset of the first resource unit, wherein the time offset is equal to a product of a first unit time span and the numerical value; or when the numerical value is 0, determine that the ACK information for the data is not required.

According to at least some embodiments, the first unit time span is obtained in one of the following manners that: the first unit time span is equal to a time span of the first resource unit; or the first unit time span is implicitly determined according to a time span of the first resource unit; or the first unit time span is determined according to signaling sent by a base station.

At least some embodiments of the disclosure provide a wireless communication device, which comprises: a processing unit, configured to determine resource configuration information, the resource configuration information being configured to determine plurality of resource units divided in frequency and time of a specific carrier and type information of each resource unit, wherein the type information of each resource unit indicates that the resource unit is one of an uplink resource unit, a downlink resource unit, or a protection resource unit; and a sending unit, configured to send the resource configuration information.

According to at least some embodiments, the resource configuration information at least comprises parameters associated with each of one or more resource units, that serve as an uplink resource unit or a downlink resource unit, of the plurality of resource units, the parameters comprise at least one of: a time span; a frequency span; a subcarrier spacing; a total number of subcarriers; a Cyclic Prefix (CP) length; whether a downlink measurement Reference Signal (RS) is present; configuration information of a downlink measurement RS; whether to support a transmission of an uplink Sounding Reference Signal (SRS); configuration information of an SRS; whether to support a transmission of a Physical Uplink Control Channel (PUCCH); configuration information of a PUCCH; whether to support a transmission of a Physical Downlink Control Channel (PDCCH) or an Enhanced PDCCH (EPDCCH); or configuration information of a PDCCH/EPDCCH.

According to at least some embodiments, time spans of at least part of the plurality of resource units are different from time spans of other resource units of the plurality of resource units and/or frequency spans of at least part of the plurality of resource units are different from frequency spans of other resource units of the plurality of resource units, or time spans and frequency spans of the plurality of resource units are identical time spans and identical frequency spans.

According to at least some embodiments, the plurality of resource units comprise a first resource unit, a second resource unit and a third source unit which are overlapped in time and not overlapped in frequency and which are consecutive or adjacent, wherein the first resource unit is an uplink resource unit, the second resource unit is a protection resource unit and the third resource unit is a downlink resource unit, or the first resource unit is a downlink resource unit, the second resource unit is a protection resource unit and the third resource unit is an uplink resource unit.

According to at least some embodiments, the plurality of resource units comprise a first resource unit, a second resource unit and a third resource unit which are overlapped in time and not overlapped in frequency and which are consecutive or adjacent, wherein the first resource unit and the third resource unit are both uplink resource units or both downlink resource units, and the second resource is a protection resource unit.

According to at least some embodiments, the second resource unit covers, in the time, an overlapping part of the first resource unit and the third resource unit in the time.

According to at least some embodiments, a frequency span of the second resource unit is determined according to characteristics of the first resource unit and the third resource unit.

According to at least some embodiments, the frequency span of the second resource unit is determined according to a communication parameter of one of the first resource unit and the third resource unit that serves as an interfering party, and a performance requirement of the other of the first resource unit and the third resource unit that serves as an interfered party.

According to at least some embodiments, the second resource unit is disposed between the first resource unit and the third resource unit at least partially according to parameters associated with the first resource unit being different from parameters associated with the third resource unit.

According to at least some embodiments, the second resource unit is disposed between the first resource unit and the third resource unit at least partially according to a subcarrier spacing of the first resource unit being different from a subcarrier spacing of the third resource unit.

According to at least some embodiments, the protection resource unit is a resource unit transmitting no signals, or the protection resource unit is configured to transmit information configured to at least partially offset external radiation of the resource units.

According to at least some embodiments, the sending unit is further configured to repeatedly send the resource configuration information; or the sending unit is further configured to send updated resource configuration information, the updated resource configuration information being configured to determine at least one of dynamically changing type information of the plurality of resource units or dynamically changing parameters associated with the plurality of resource units; or the sending unit is further configured to send updated resource configuration information, the updated resource configuration information being configured to determine at least one of dynamically changing type information of the plurality of resource units or dynamically changing parameters associated with the plurality of resource units, and the at least one of dynamically changing type information of the plurality of resource units or dynamically changing parameters associated with the plurality of resource units being valid during a specific time period; or the sending unit is further configured to send updated resource configuration information, the updated resource configuration information being configured to determine at least one of dynamically changing type information of the plurality of resource units or dynamically changing parameters associated with the plurality of resource units, and at least one of type information of the plurality of resource units or parameters associated with the plurality of resource units dynamically changes according to the updated resource configuration information after a specific time point.

According to at least some embodiments, the configuration information is sent through at least one of System Information (SI), high-layer signaling, or Downlink Control Information (DCI).

According to at least some embodiments, the configuration information is obtained through the DCI sent in a Common Search Space (CSS).

According to at least some embodiments, the processing unit is further configured to generate resource scheduling information, wherein the resource scheduling information indicates a first resource unit of the plurality of resource units which is configured for a terminal to receive or send data, and the resource scheduling information indicates a second resource unit of the plurality of resource units which is configured for the terminal to correspondingly send or receive Acknowledgement (ACK) information for the data, or indicates that ACK information for the data is not required; and the sending unit is further configured to send the resource scheduling information.

According to at least some embodiments, the resource scheduling information indicates a numerical value, and the numerical value is configured to determine a time position of the second resource unit based on a first unit time span; or the numerical value is specified to be 0 to indicate that the ACK information for the data is not required.

According to at least some embodiments, the first unit time span is obtained in one of the following manners that: the first unit time span is equal to a time span of the first resource unit; the first unit time span is implicitly determined according to a time span of the first resource unit; or the first unit time span is determined according to signaling sent by a base station.

At least some embodiments of the disclosure provide a wireless communication device, which comprises a processor and a memory storing a computer program that when executed by the processor, cause the processor to receive resource configuration information, the resource configuration information being configured to determine a plurality of resource units divided in frequency and time of a specific carrier and type information of each resource unit, wherein the type information of each resource unit indicates that the resource unit is one of an uplink resource unit, a downlink resource unit, or a protection resource unit; and perform communication on the carrier based on the resource configuration information.

According to at least some embodiments, the processor is further configured to receive resource scheduling information, wherein the resource scheduling information indicates a first resource unit of the plurality of resource units which is configured for a terminal to receive or send data, and the resource scheduling information indicates a second resource unit of the plurality of resource units which is configured for the terminal to correspondingly send or receive Acknowledgement (ACK) information for the data, or indicates that ACK intonation for the data is not required.

At least some embodiments of the disclosure provide a non-transitory computer-readable storage medium having stored thereon instructions that when executed by a processors, cause the processor to implement a wireless communication method, the method comprising: receiving resource configuration information, the resource configuration information being configured to determine a plurality of resource units divided in frequency and time of a specific carrier and type information of each resource unit, wherein the type information of each resource unit indicates that the resource unit is one of an uplink resource unit, a downlink resource unit, or a protection resource unit; and performing communication on the carrier based on the resource configuration information.

According to the solutions of the embodiments of the disclosure, in a frame, resource units are flexibly divided in two dimensions, i.e., frequency and time, of a target carrier, each resource unit is allowed to be configured as an uplink resource unit or a downlink resource unit, and a protection resource unit is inserted between two resource units which may seriously interfere with each other. In such a manner, multiple uplink and downlink proportions may also be provided in different time intervals even in a bandwidth of a frequency band of the same target carrier, so that changes in uplink and downlink data traffic may be flexibly adapted, and the problem of interference between each resource unit is effectively solved.

Figure 2:
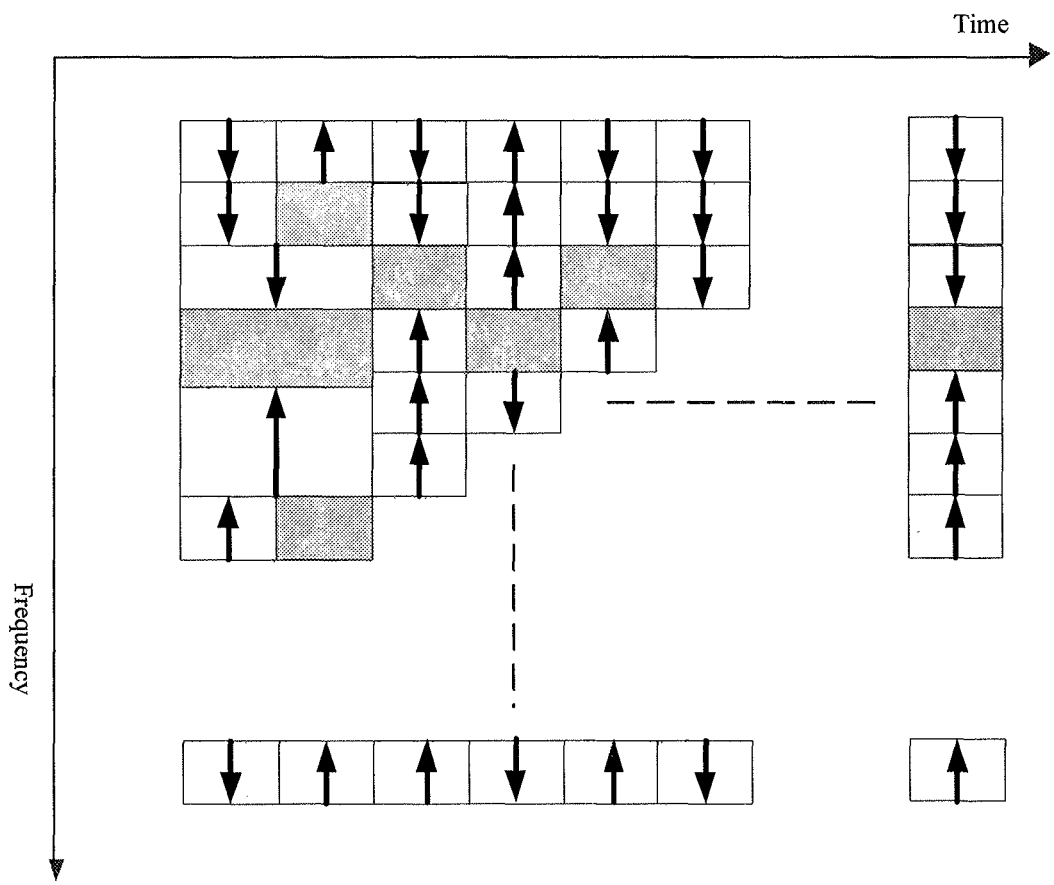
FIG. 2 is a schematic diagram of a resource configuration manner according to an embodiment of the disclosure.

FIG. 2 is a schematic diagram of a resource configuration manner according to an embodiment of the disclosure. In a frame structure illustrated in FIG. 2, radio resources are divided into multiple resource units in time and frequency, and each resource unit is represented with a time length and an occupied frequency bandwidth (called hereinafter as a time span and a frequency span, respectively) of the resource unit. For convenient description, in this example, a total lime length of the illustrated multiple resource units is a length of a frame and is, but not limited to, for example, 10 ms, and a total frequency length of the illustrated multiple resource units is a frequency bandwidth of a carrier of a cell and is, but not limited to, for example, 100 MHz.

In the frame structure illustrated in FIG. 2, the radio resources are allocated by taking a resource unit in a time-frequency domain as a unit, and a time span and a frequency span occupied by each resource unit are not always the same, the time span and the frequency span occupied by each resource unit may be configured to be the same and may also be configured to be different, so that a more flexible resource configuration may be provided. Multiple uplink and downlink proportions may be provided by allowing the time span and frequency span of each resource unit to be flexibly configured, so that different requirements of multiple different services may be supported. For example, as illustrated in a third row and fifth row in a first column in FIG. 2, uplink and downlink resource units with larger time spans are provided to facilitate improvement in performance of a burst service and particularly facilitate massive burst service transmission.

Each resource unit may be configured as a resource u configured for uplink transmission (as illustrated by the upward arrow in the figure, called hereinafter as an uplink resource unit), a resource unit configured for downlink transmission (as illustrated by the downward arrow in the figure, called hereinafter as a downlink resource unit), or a resource unit configured for protection (as illustrated by the grey box in the figure, called hereinafter as a protection resource unit).

A protection resource unit is configured to isolate two resource units which may interfere with each other in a frequency domain. As illustrated in FIG. 2, if two resource units overlapped in a time domain may interfere with each other, then a protection resource unit may be configured between the two resource units. It should be understood that overlapping mentioned herein includes partial overlapping and also includes complete overlapping. It should be understood that two neighboring resource units overlapped in the time domain refer to two neighboring resource units in the frequency.

According to an embodiment, when transmission directions between two neighboring resource units overlapped in the time domain change, for example, one is an uplink resource unit and the other is a downlink resource unit, a protection resource unit may be configured between the two resource units.

According to another embodiment, even though transmission directions of two neighboring resource units overlapped in the time domain are the same, for example, the two resource units are both downlink resource units or both uplink resource units, it is determined whether a protection resource unit need to be configured between the two resource units based on parameters associated with the two resource units. When the parameters associated with the two resource units are different, the protection resource unit may usually be configured between the two resource units. For example, parameters associated with a resource unit include at least one of: a time span; a frequency span; a subcarrier spacing; a total number of subcarriers; a Cyclic Prefix (CP) length; whether a downlink measurement Reference Signal (RS) is present; configuration information of a downlink measurement RS; whether to support a transmission of an uplink Sounding Reference Signal (SRS); configuration information of an SRS; whether to support a transmission of a Physical Uplink Control Channel (PUCCH); configuration information of a PUCCH; whether to support a transmission of a Physical Downlink Control Channel (PDCCH) or an Enhanced PDCCH (EPDCCH); and configuration information of a PDCCH/EPDCCH. For example, when subcarrier spacings of the two resource units are different, the protection resource unit may be configured between the two resource units. As an example, but not a limitation of the embodiment, for example, under the condition that one resource unit includes one or more 15 kHz subcarriers and the other resource unit includes one or more 7.5 kHz subcarriers, since different subcarrier spacings may bring the problem that the subcarriers are non-orthogonal to further bring relatively serious interference between the two resource units, the protection resource unit may be set between the two resource units.

In yet another embodiment, when it is determined whether a protection resource unit is configured, other factors may also be considered, for example, whether the two neighboring resource units overlapped in the time domain meet a mutual interference protection condition in the frequency domain, for example, whether external radiation of the resource units is greater than a threshold value. When the external radiation is greater than the threshold value, the protection resource unit may be inserted.

In still another embodiment, when it is determined whether a protection resource unit is configured, the other factors may also be additionally considered on the basis of the above two embodiments. For example, when transmission directions between two neighboring resource units overlapped in the time domain change and the two resource units do not meet the mutual interference protection condition in the frequency domain, the protection resource unit may be configured between the two resource units. For example, when parameters associated with two neighboring resource units overlapped in the time domain are different and the two resource units do not meet the mutual interference protection condition in the frequency domain, the protection resource unit may be configured between the two resource units.

According to an embodiment, when a protection resource unit is configured between two neighboring resource units overlapped in the time domain, the protection resource unit is configured to cover, in the time, an overlapping part of the two resource units to be protected in the time.

According to an embodiment, when a protection resource unit is configured between the two neighboring resource units overlapped in the time domain, a frequency span of the protection resource unit may be determined according to characteristics of the two resource units to be protected. For example, usually, one of the two resource units may be an interfering party and the other of the two resource units may be an interfered party, it should be understood that the two resource units may also interfere with each other, and under a typical condition, downlink transmission interferes with uplink reception. The frequency span of the protection resource unit may be determined according to the characteristics (for example, parameters such as a basic signal waveform and a subcarrier width, transmission power and a size of resources continuously used in the frequency domain) of the interfering party and a protection degree requirement or performance requirement (for example, a maximum interference characteristic such as blocking and de-sensitization bearable for the used basic signal waveform and parameter, a service type and the like) of the interfered party. According to another embodiment, the frequency span of the protection resource unit may be predefined.

According to an embodiment, at least one of a time span or a frequency span of the protection resource unit may be indicated through signaling, and for example, at least one of the time span or the frequency span of the protection resource unit is indicated to a terminal by a base station. According to another embodiment, the frequency span of the protection resource unit may be implicitly calculated through a resource allocation condition, so that the base station does not need to explicitly indicate to the terminal at least one of the frequency span or the time span of the protection resource unit, but the base station only indicates to the terminal time-frequency information of the uplink resource unit and the downlink resource unit, and thus the time-frequency information of the protection resource unit may be determined. Correspondingly, the base station does not need to explicitly indicate to the terminal type information of the protection resource unit, the type information indicates that a certain resource unit is a protection resource unit.

According to an embodiment, no information may be transmitted in a time-frequency region of the protection resource unit, that is, the protection resource unit is configured as a blank resource unit.

According to another embodiment, information configured to reduce out-of-band radiation of the uplink and downlink resource units may be transmitted in the time-frequency region of the protection resource unit, for example, information opposite to a phase of an out-of-band radiation of the uplink and downlink resource units may be transmitted in the protection resource unit, so that interference of the uplink and downlink resource units may further be reduced.

A resource configuration manner according to an embodiment is described above in combination with the frame structure illustrated in FIG. 2. It should be understood that multiple specific resource configuration manners may be provided according to a manner similar to the frame structure illustrated in FIG. 2. A proper resource configuration manner may be adopted according to a network condition or the resource configuration manner may be dynamically adjusted according to the network condition.

In the above descriptions made for FIG. 2, a resource configuration manner according to an embodiment is described by taking a carrier of a cell as an example. The cell may also include multiple carriers, for example, including, but not limited to, three carriers. The resource configuration manner described for FIG. 2 is also applied to a multi-carrier condition. For example, under the condition that the multiple carriers of the cell are aggregated, a total bandwidth after aggregation may be divided in the frequency to obtain multiple resource units, and herein, a total bandwidth in a frequency direction in FIG. 2 may be considered as the total bandwidth after carrier aggregation. For another example, resource configurations with the frame structure illustrated in FIG. 2 may be provided for the multiple carriers of the cell, respectively, and the resource configurations provided for the multiple carriers respectively may be the same or may also be different.

It should be understood that in the above descriptions, although the total bandwidth of the frame structure illustrated in FIG. 2 in the frequency domain is described as a bandwidth of a target carrier, the frequency-domain bandwidth taken as a division basis may also be a part of the total bandwidth of the target carrier.

It should be understood that in the above descriptions, although each resource unit, divided in the frequency and the time in the frame structure illustrated in FIG. 2, is represented to be consecutive in the frequency in the schematic diagram of FIG. 2, the resource units divided in the frequency are not always closely continuous in the frequency but adjacent in the frequency. For example, the divided two adjacent resource units overlapped in the time may also be separated by a certain distance in the frequency. For another example, when one of two resource units overlapped in the time generates considerable radiation within a certain frequency range outside the one of the two resource units, for example, the radiation exceeds a threshold value, while part or all of the other of the two resource units is within a range of the radiation exceeding the threshold value, the two resource units may be considered to be adjacent.

Figure 3:
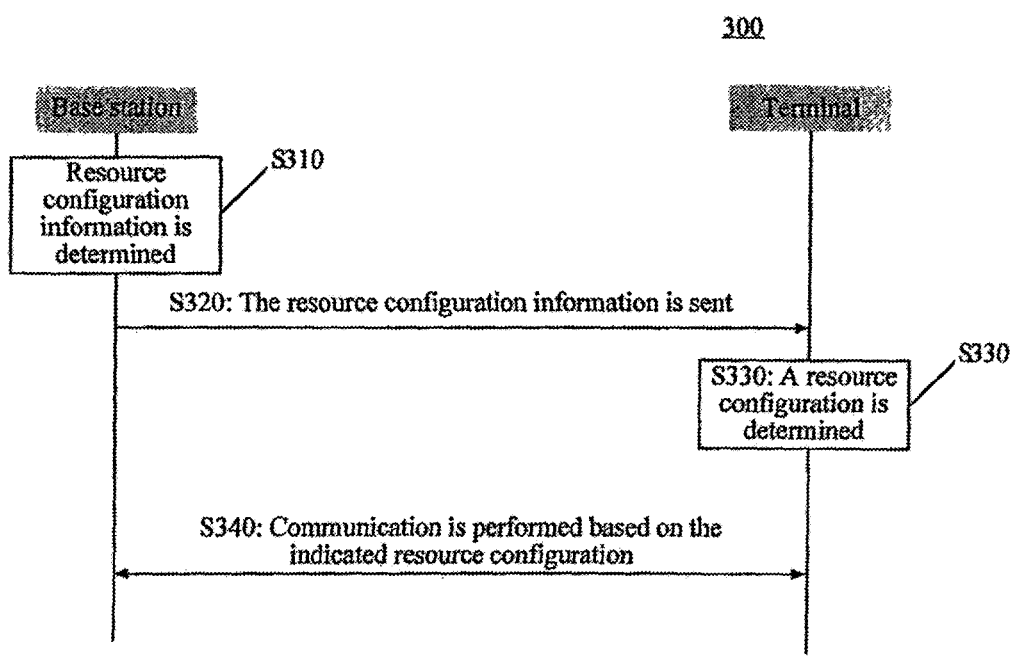
FIG. 3 is a communication method according to an embodiment of the disclosure.

FIG. 3 is a flowchart of a communication method 300 according to an embodiment of the disclosure.

In S310, a base station determines resource configuration information, the resource configuration information is configured to indicate, for example, a resource configuration or frame structure described above in combination with FIG. 2. Specifically, the resource configuration information is configured to determine multiple resource units divided in frequency and time of a specific carrier and type information of each resource unit. For example, the type information of each resource unit indicates that the resource unit is one of an uplink resource unit, a downlink resource unit, or a protection resource unit.

In an embodiment, the resource configuration information may explicitly indicate respective sizes and positions and respective types of the multiple resource units divided in the frequency and the time. In another embodiment, the resource configuration information may only explicitly indicate respective sizes and positions and respective types of the uplink and downlink resource units of the multiple resource units divided in the frequency and the time, and a terminal may determine sizes and positions of the protection resource units according to the respective sizes and positions of the uplink resource units and the downlink resource units. Therefore, under this condition, the resource configuration information implicitly indicates the sizes, positions and types of the protection resource units.

In an embodiment, the base station may select a resource configuration from multiple predefined resource configurations. In another embodiment, the base station may dynamically generate the resource configuration information. In yet another embodiment, the base station may dynamically adjust configurations of at least part of the resource units based on a predefined resource configuration.

In S320, the base station sends the determined resource configuration information. In an embodiment, the resource configuration information may be sent through System Information (SI). In another embodiment, the resource configuration information may be sent through high-layer signaling. In yet another embodiment, the resource configuration information may be sent through Downlink Control Information (DCI).

In S330, after receiving the resource configuration information, the terminal may determine a resource configuration of a cell, for example, the resource configuration illustrated in FIG. 2, based on the configuration information.

In S340, the terminal and the base station may implement communication on the frequency of the specific carrier based on the indicated resource configuration.

In an embodiment, the base station repeatedly sends the adopted resource configuration information in S320, the resource configuration (for example, at least one of a type of each resource unit or parameters associated with each resource unit) adopted based on the resource configuration information is periodically repeated, and for example, is periodically repeated by taking a frame length as a unit, and the frame length is, but not limited to, for example, 10 ms. For example, the resource configuration information is periodically sent though the SI or the high-layer signaling.

In another embodiment, the base station may update the resource configuration information according to a network condition (for example, a performance requirement of a present service) in S310 and send the updated resource configuration information in S320. For example, the updated resource configuration information is sent through the DCI. For example, the DCI carrying the configuration information is sent in a Common. Search Space (CSS). In an embodiment, the base station may send the updated resource configuration information at any time point in a frame without waiting for the end of the frame to send the updated resource configuration information, so that a changing communication performance requirement may be rapidly adapted.

Figure 4:
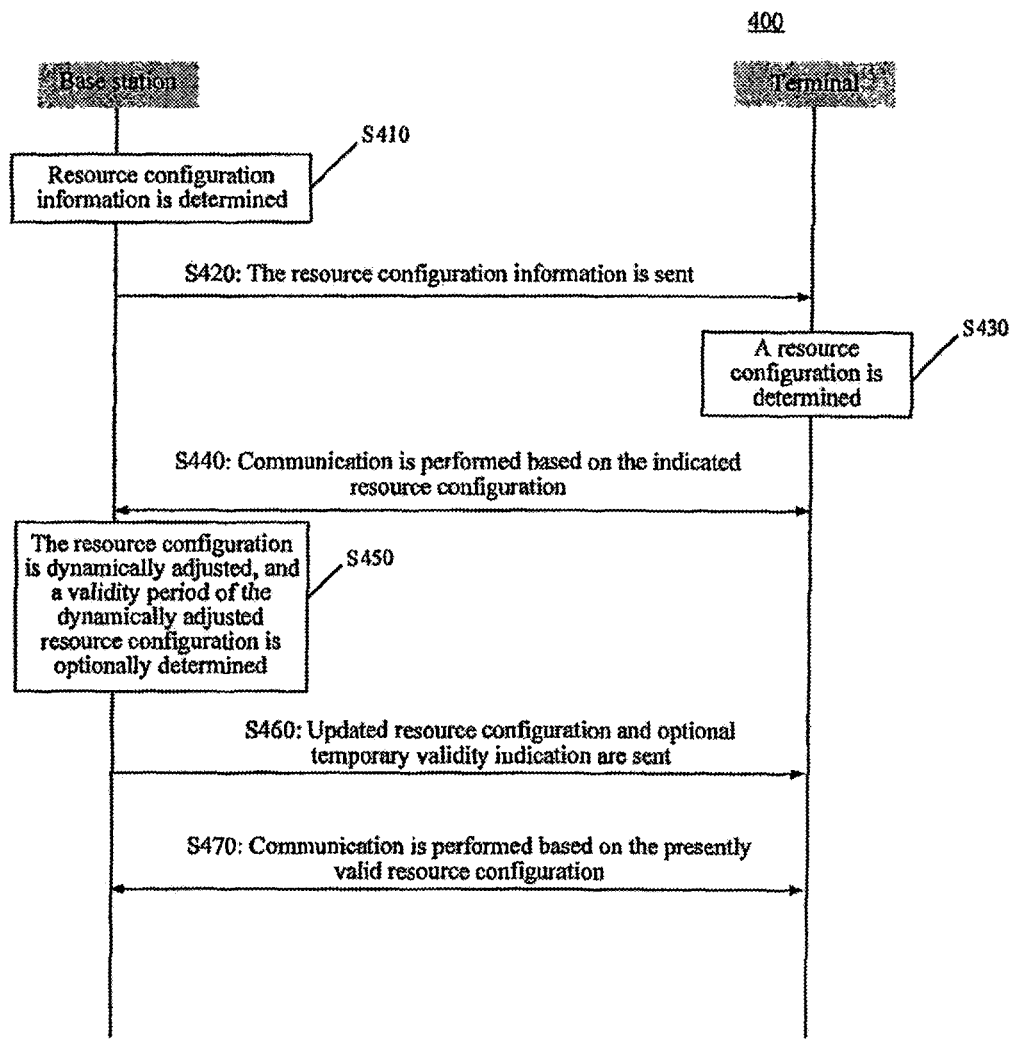
FIG. 4 is another communication method according to an embodiment of the disclosure.

FIG. 4 is a flowchart of another communication method 400 according to an embodiment of the disclosure.

In S410, a base station determines resource configuration information, which is similar to the operation in S310.

In S420, the base station repeatedly sends the adopted resource configuration information. A resource configuration (for example, at least one of a type of each resource unit or parameters associated with each resource unit) adopted based on the resource configuration information is periodically repeated, and for example, is periodically repeated by taking a frame length as a unit. For example, the resource configuration information is periodically sent though SI or high-layer signaling.

In S430, after receiving the resource configuration information, the terminal may determine a resource configuration on a specific carrier based on the configuration information.

In S440, the terminal and the base station may implement communication on the specific carrier based on the periodically repeated resource configuration.

In S450, the base station may dynamically adjust part or all of the resource configuration (for example, at least one of the types of part or all of the resource units or parameters associated with part or all of the resource units) to obtain an updated resource configuration, and the base station may determine a validity period of the updated resource configuration. For example, the base station may determine that the validity period of the updated resource configuration is temporary, for example, the updated resource configuration is maintained for one or more Transmission Time Intervals (TTIs) and then the periodically repeated resource configuration is automatically resumed. For example, the base station may determine that the updated resource configuration is valid until a next updated resource configuration is received. Under this condition, the periodic resource configuration sent in S410 should also be a presently valid resource configuration.

In S460, the base station sends the updated resource configuration and optionally sends an indication about that the updated resource configuration is temporally valid. For example, the updated resource configuration information is sent through DCI. Correspondingly, after receiving the updated resource configuration, the terminal may determine that the updated resource configuration is valid in the temporary validity period and then the periodically repeated resource configuration that is taken as a basis is resumed, or the terminal may determine that the updated resource configuration is valid until the next updated resource configuration is received. For example, under the condition that the periodically repeated resource configuration is taken as the basis, the terminal may determine to operate according to the dynamically changing resource configuration information after a specific time point and will not resume the periodically repeated resource configuration that is taken as the basis. The specific time point is, for example, a preconfigured time point, a time point indicated by the base station or a time point corresponding to reception of the indication from the base station. The indication received from the base station indicates, for example, that the updated resource configuration is valid until the next updated resource configuration is received.

In S470, the terminal and the base station communicate on a target carrier based on the updated resource configuration and optionally implement communication based on the resumed resource configuration after the validity period of the updated resource configuration.

Figure 5:
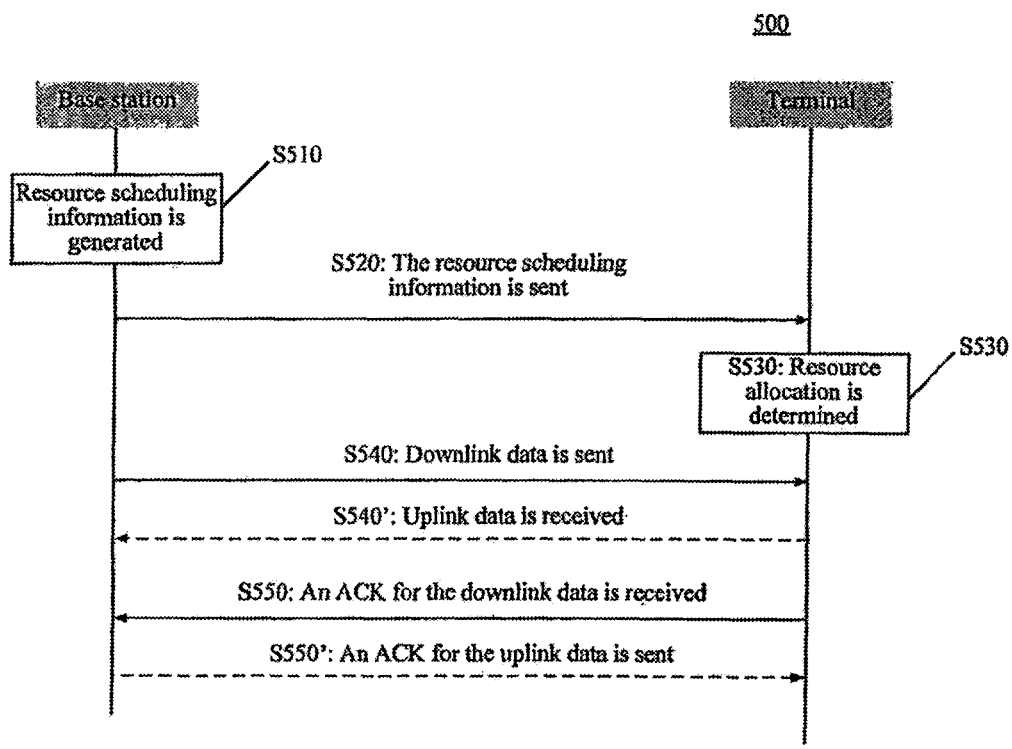
FIG. 5 is yet another communication method according to an embodiment of the disclosure.

FIG. 5 is a flowchart of a communication method according to an embodiment of the disclosure.

In S510, a base station allocates resources for a terminal and generates resource scheduling information. The resource scheduling information indicates one of multiple resource units in a resource configuration, the one of the multiple resource units is configured for the terminal to receive or send data.

Here, an Acknowledgement (ACK) feedback mechanism is further improved when for example the flexible resource configuration manner described in combination with FIG. 2 is adopted.

In an embodiment, the base station allocates or schedules for the terminal a resource unit A configured for downlink data transmission, and the base station may schedule to receive a corresponding ACK/Negative Acknowledgement (NACK) after N1 Tills after the resource unit A, which means that an uplink resource unit 13 configured for ACK feedback is required to be scheduled after the N1 TTIs. N1 may have different value ranges for different types of terminals (for example, eMBB, URLLC and mMTC). In an embodiment, a time position of the uplink resource unit B may be determined based on a time position and a time offset of the downlink resource unit A, here the time offset is equal to a product of a unit time span and N1. In an embodiment, the unit time span may be equal to a time span of the downlink resource unit A. In another embodiment, the unit time span may be implicitly determined according to time span of the downlink resource unit A. For example, the unit time span may be calculated based on the time span of the downlink resource unit A according to a predefined calculation method. In yet another embodiment, the unit time span may be determined according to signaling sent by the base station.

In another embodiment, the base station allocates or schedules for the terminal a resource unit C configured for uplink data transmission, and the base station may schedule to receive a corresponding ACK/NACK after N2 TTIs after the resource unit C, which means that a downlink resource unit D configured for ACK feedback is required to be scheduled after the N2 TTIs. N2 may have different value ranges for different types of terminals (for example, eMBB, URLLC and mMTC). In an embodiment, a time position of the resource unit D may be determined based on a time position and a time offset of the resource unit C, herein the time offset is equal to a product of a unit time span and N2. In an embodiment, the unit time span may be equal to a time span of the uplink resource unit C. In another embodiment, the unit time span may be implicitly determined according to the time span of the uplink resource unit C. In yet another embodiment, the unit time span may be determined according to the signaling sent by the base station.

In an embodiment, values of the TTIs may be the time spans of the scheduled resource units configured for data transmission. It should be understood that the time spans of the scheduled resource units configured for data transmission are not always kept unchanged.

In another embodiment, the base station may determine that ACK feedback is not required. For example, a value of N1 or N2 is set as a specific value, for example, 0, to indicate that ACK feedback is not required.

In S510, the base station schedules for the terminal the resource unit configured to receive or send the data, and in addition, the base station also schedules a resource unit configured to send or receive a corresponding ACK feedback for the data. The base station may directly and explicitly indicate the resource unit configured for feedback in a resource allocation message, and may also indicate the value N1 or N2 in the resource allocation message to implicitly indicate the resource unit configured for feedback.

In S520, the base station sends the generated resource scheduling information. For example, the resource scheduling information may be sent through DCI.

In S530, the terminal determines transmission resources allocated for the terminal by using the resource scheduling information.

In S540 or S540', the terminal receives downlink data or sends uplink data by using the allocated resource unit indicated by the resource scheduling information.

In S550 or S550', the terminal correspondingly sends ACK information for the downlink data or receives ACK information for the uplink data by using resources that indicated by the resource scheduling information and that configured to transmit the ACK information.

Figure 6:
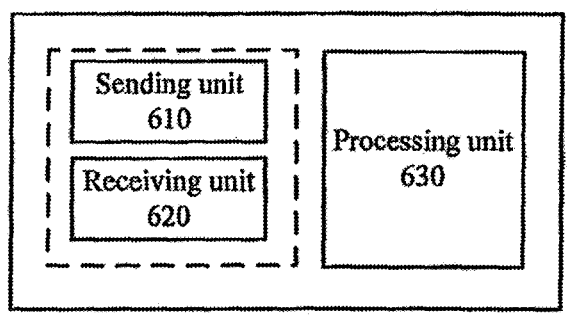
FIG. 6 is a communication device according to an embodiment of the disclosure.

FIG. 6 is a schematic diagram of a communication device 600 according to an embodiment of the disclosure. The device 600 includes a sending unit 610, a receiving unit 620 and a processing unit 630. It can be understood that the sending unit 610 and the receiving unit 620 may be collectively referred to or implemented as a transceiver unit.

In an embodiment, the device 600 may be implemented as a terminal. The device includes that the receiving unit 620, configured to receive resource configuration information; and the processing unit 630, configured to determine multiple resource units divided in frequency and time of a specific carrier and type information of each resource unit according to the received resource configuration information, here the type information indicates that each resource unit is one of an uplink resource unit, a downlink resource unit, or a protection resource unit, and perform communication on the carrier based on the resource configuration information. It can be understood that the receiving unit 620 and the processing unit 630 may further execute various operations described above in combination with FIG. 2 to FIG. 5.

In an embodiment, the device 600 may be implemented as a base station. The device includes that the processing unit 630, configured to determine resource configuration information, the resource configuration information indicates the multiple resource units divided in the frequency and time of the specific carrier and the type information of each resource unit, here the type information of each resource unit indicates that the resource unit is one of an uplink resource unit, a downlink resource unit, or a protection resource unit; and the sending unit 610, configured to send the resource configuration information. It can be understood that the sending unit 610 and the processing unit 630 may further execute various operations described above in combination with FIG. 2 to FIG. 5.

Figure 7:
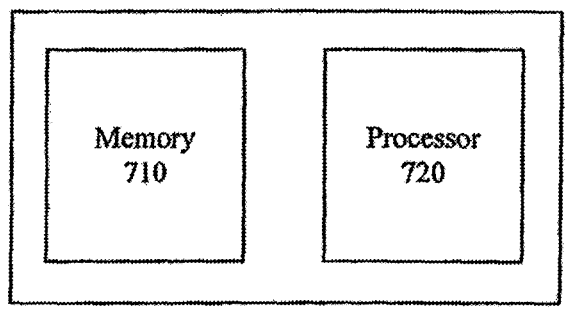
FIG. 7 is another communication device according to an embodiment of the disclosure.

FIG. 7 is a schematic diagram of a communication device 700 according to an embodiment of the disclosure. The device 700 includes a memory 710 and a processor 720. The processor 720 may execute an instruction stored in the memory 710 to cause the communication device 700 to implement the operations described in each embodiment.

Some embodiments of the disclosure are described above in combination with the drawings in detail. These embodiments may be combined arbitrarily without departing from the scope of the description in the disclosure.

Term "determine" used in the disclosure include various actions. For example, "determine" may include calculation, operation, processing, deduction, survey, query (for example, a query in a table, a database or another data structure), conclusion and the like. In addition, "determine" may further include reception (for example, reception of information), access (for example, access to data in a memory) and the like. Moreover, "determine" may further include solution, designation, selection, establishment and the like.

Information and signals may be represented by use of various technologies and methods. For example, data, instructions, commands, information, signals and the like mentioned throughout the above descriptions may be represented with voltages, currents, electromagnetic waves, magnetic fields or magnetic particles, light fields or light particles or any combinations thereof.

A universal processor, Digital Signal Processor (DSP), Application Specific Integrated Circuit (ASIC), Field Programmable Gate Array (FPGA) or another Programmable Logic Device (PLD), discrete gate or transistor unit, discrete hardware component or any combination thereof configured to realize the functions of the disclosure may implement or execute various exemplary logical block diagrams, modules and circuits described in combination with the contents disclosed in the disclosure. The universal processor may be a microprocessor or the processor may also be any commercially available processor, controller, microcontroller or state machine. The processor may also be implemented as a combination of computing equipment, for example, a combination of a DSP and a microprocessor, multiple microprocessors and a combination of one or more microprocessors and DSP cores, or any other such structures.

The operations of the method or algorithm described in combination with the contents disclosed in the disclosure may directly be embodied as hardware, software modules executed by the processor, or a combination thereof. In an embodiment, a processor in a calling User Equipment (UE) executes a computer program (instruction) stored in a storage medium and may execute the operations in each embodiment to implement a method for determining a coding and decoding mode set for service communication. The software modules may be in any form of storage mediums well-known in the field. Some exemplary available storage media include: a Random Access Memory (RAM), a Read-Only Memory (ROM), a flash memory, an Electrically Programmable Read-Only Memory (EPROM), an Electrically Erasable Programmable Read-Only Memory (EEPROM), a register, a hard disk, a mobile disk, a Compact. Disc Read-Only Memory (CD-ROM) and the like. The software module may include a single instruction or multiple instructions, and these instructions may be distributed on some different code segments, distributed in different programs or distributed in multiple storage media. The storage medium may be coupled to the processor, thereby enabling the processor to read information from the storage medium and write information into the storage medium. Optionally, the storage medium may also be a component of the processor.

The method disclosed in the disclosure includes one or more operations or actions implementing the method. These operations and/or actions of the method may be exchanged without departing from the scope of protection of the disclosure. In other words, the sequence and/or use of specific operations and/or actions may be modified without departing from the scope of protection of the disclosure, unless the operations or actions are specified to be executed in a specific sequence.

The functions of the disclosure may be realized by use of hardware, software, firmware or any combination thereof. When the functions are realized by use of the software, these functions may be stored in a computer-readable storage medium as one or more instructions. The storage medium may be any available medium accessible for a computer. In an exemplary but unlimitedly manner, the computer-readable medium may include a RAM, a ROM, an EEPROM, a CD-ROM or another optical disk, magnetic disk storage medium or other magnetic storage medium, or any other medium configured to carry or store program codes in an expected instruction or data structure form and accessible for the computer. Disks and discs used in the disclosure include a Compact Disc (CD), a laser disc, an optical disk, a Digital Video Disk (DVD), a floppy disk and a Blue-ray® disk, here the disks usually magnetically copy data, while the discs optically copy data with laser.

In addition, the software or the instructions may also be transmitted on a transmission medium. For example, if the software is transmitted from a website, a server or another remote source by use of a coaxial cable, an optical fiber cable, a twisted pair, a Digital Subscriber Line (DSL) or a wireless technology such as infrared, wireless and microwave technologies, then the coaxial cable, the optical fiber cable, the twisted pair, the DSL or the wireless technology such as the infrared, wireless and microwave technologies are included in the definition about the transmission medium.

Moreover, it should be understood that modules and/or other proper manners configured to execute the method and technology of the disclosure may be downloaded and/or obtained as needed through a user terminal and/or a base station. For example, such equipment may be coupled to the server to facilitate implementation of the modules executing the method of the disclosure. Optionally, various methods of the disclosure may be provided through a storage module (for example, a RAM, a ROM and a physical storage medium such as a CD or a floppy disk), so that the user terminal and/or the base station may obtain various methods when the storage module is coupled to or provided for the equipment. In addition, any other proper technology providing the method and technology of the disclosure for the equipment may further be used.

It should be understood that the disclosure is not limited to exact configurations and components above. Various modifications, transformations and variations may be made to the above arrangement, operations and details of the method and the device without departing from the scope of protection of the disclosure.

The disclosure is not limited to these disclosed embodiments and other solutions deduced therefrom by those skilled in the art also fall within the scope of protection of the disclosure. Therefore, the scope of protection of the disclosure shall be defined by the appended claims.

It should be noted that term "include" in the claims does not exclude existence of a component, unit or device which is not listed in the claims or the specification. Term "a/an" or "one" before the component, the unit or the device does not exclude existence of multiple such components, units or devices. In the device claims where multiple units are listed, some of these units may be implemented by use of the same type of software and/or hardware.

The invention claimed is:

1. A wireless communication method, comprising:
   receiving, by a terminal, resource configuration information, the resource configuration information being configured to determine a plurality of resource units divided in frequency and time of a specific carrier and type information of each resource unit, wherein the type information of each resource unit indicates that the resource unit is one of an uplink resource unit, a downlink resource unit, or a protection resource unit,
   receiving, by the terminal, resource scheduling information, wherein the resource scheduling information indicates a first resource unit of the plurality of resource units which is configured for a terminal to receive or send data, and the resource scheduling information indicates a second resource unit of the plurality of resource units which is configured for the terminal to correspondingly send or receive Acknowledgement (ACK) information for the data, or indicates that ACK information for the data is not required, wherein the resource scheduling information indicates a numerical value;
   when the numerical value is not 0, determining, by the terminal, a time position of the second resource unit based on a time position of the first resource unit and a time offset, wherein the time offset is equal to a product of a first unit time span and the numerical value; and
   performing, by the terminal, communication on the carrier based on the resource units indicated by the resource scheduling information.

2. The method of claim 1, wherein the resource configuration information at least comprises parameters associated with each of one or more resource units, that serve as an uplink resource unit or a downlink resource unit, of the plurality of resource units, and the parameters comprise at least one of:
   a time span;
   a frequency span;
   a subcarrier spacing;

a total number of subcarriers;
a Cyclic Prefix (CP) length;
whether a downlink measurement Reference Signal (RS) is present;
configuration information of a downlink measurement RS;
whether to support a transmission of an uplink Sounding Reference Signal (SRS);
configuration information of an SRS;
whether to support a transmission of a Physical Uplink Control Channel (PUCCH);
configuration information of a PUCCH;
whether to support a transmission of a Physical Downlink Control Channel (PDCCH) or an Enhanced PDCCH (EPDCCH); or
configuration information of a PDCCH/EPDCCH.

3. The method of claim 1, wherein
time spans of at least part of the plurality of resource units are different from time spans of other resource units of the plurality of resource units and/or frequency spans of at least part of the plurality of resource units are different from frequency spans of other resource units of the plurality of resource units, or
time spans and frequency spans of the plurality of resource units are identical time spans and identical frequency spans.

4. The method of claim 1, wherein the plurality of resource units comprise a first resource unit, a second resource unit and a third resource unit which are overlapped in time and not overlapped in frequency and which are consecutive or adjacent, wherein the first resource unit is an uplink resource unit, the second resource unit is a protection resource unit and the third resource unit is a downlink resource unit, or the first resource unit is a downlink resource unit, the second resource unit is a protection resource unit and the third resource unit is an uplink resource unit.

5. The method of claim 1, wherein the plurality of resource units comprise a first resource unit, a second resource unit and a third resource unit which are overlapped in time and not overlapped in frequency and which are consecutive or adjacent, wherein the first resource unit and the third resource unit are both uplink resource units or both downlink resource units, and the second resource unit is a protection resource unit.

6. The method of claim 4, wherein the second resource unit covers, in the time, an overlapping part of the first resource unit and the third resource unit in the time.

7. The method of claim 4, wherein a frequency span of the second resource unit is determined according to characteristics of the first resource unit and the third resource unit.

8. The method of claim 5, wherein the second resource unit is disposed between the first resource unit and the third resource unit based on parameters associated with the first resource unit and the third resource unit.

9. The method of claim 1, wherein
the protection resource unit is a resource unit transmitting no signals, or
the protection resource unit is configured to transmit information configured to at least partially offset external radiation of the resource units.

10. The method of claim 1, wherein
at least one of type information of the plurality of resource units or parameters associated with the plurality of resource units is periodically repeated in time; or
at least one of type information of the plurality of resource units or parameters associated with the plurality of resource units dynamically changes according to updated resource configuration information received; or
at least one of type information of the plurality of resource units or parameters associated with the plurality of resource units is based on periodic repetition in time, and at least one of type information of at least part of the plurality of resource units or parameters associated with the at least part of the plurality of resource units dynamically changes during a specific time period according to updated resource configuration information received, and the at least one of type information of the plurality of resource units or parameters associated with the plurality of resource units that is based on the periodic repetition is resumed after the specific time period; or
at least one of type information of the plurality of resource units or parameters associated with the plurality of resource units is based on periodic repetition in time, and at least one of type information of at least part of the plurality of resource units or parameters associated with the at least part of the plurality of resource units dynamically changes after a specific time point according to updated resource configuration information received.

11. The method of claim 10, wherein the resource configuration information is received through at least one of System Information (SI), high-layer signaling, or Downlink Control Information (DCI).

12. The method of claim 11, wherein the resource configuration information is obtained through the DCI received in a Common Search Space (CSS).

13. The method of claim 1, further comprising:
when the numerical value is 0, determining that the ACK information for the data is not required.

14. The method of claim 13, wherein the first unit time span is obtained in one of the following manners that:
the first unit time span is equal to a time span of the first resource unit; the first unit time span is implicitly determined according to a time span of the first resource unit; or
the first unit time span is determined according to signaling sent by a base station.

15. The method of claim 5, wherein the second resource unit covers, in the time, an overlapping part of the first resource unit and the third resource unit in the time.

16. The method of claim 5, wherein a frequency span of the second resource unit is determined according to characteristics of the first resource unit and the third resource unit.

17. A wireless communication device, comprising a processor and a memory storing a computer program that when executed by the processor, cause the processor to:
receive resource configuration information, the resource configuration information being configured to determine a plurality of resource units divided in frequency and time of a specific carrier and type information of each resource unit, wherein the type information of each resource unit indicates that the resource unit is one of an uplink resource unit, a downlink resource unit, or a protection resource unit,
receive resource scheduling information, wherein the resource scheduling information indicates a first resource unit of the plurality of resource units which is configured for a terminal to receive or send data, and the resource scheduling information indicates a second resource unit of the plurality of resource units which is configured for the terminal to correspondingly send or receive Acknowledgement(ACK) information for the data, or indicates that ACK information for the data is not required, wherein the resource scheduling information indicates a numerical value;

when the numerical value is not 0, determine a time position of the second resource unit based on a time position of the first resource unit and a time offset, wherein the time offset is equal to a product of a first unit time span and the numerical value; and perform communication on the carrier based on the resource units indicated by the resource scheduling information.

18. A non-transitory computer-readable storage medium having stored thereon instructions that when executed by a processor of a terminal, cause the processor to implement a wireless communication method, the method comprising:

receiving resource configuration information, the resource configuration information being configured to determine a plurality of resource units divided in frequency and time of a specific carrier and type information of each resource unit, wherein the type information of each resource unit indicates that the resource unit is one of an uplink resource unit, a downlink resource unit, or a protection resource unit, receiving resource scheduling information, wherein the resource scheduling information indicates a first resource unit of the plurality of resource units which is configured for a terminal to receive or send data, and the resource scheduling information indicates a second resource unit of the plurality of resource units which is configured for the terminal to correspondingly send or receive Acknowledgement(ACK) information for the data, or indicates that ACK information for the data is not required, wherein the resource scheduling information indicates a numerical value;

when the numerical value is not 0, determining a time position of the second resource unit based on a time position of the first resource unit and a time offset, wherein the time offset is equal to a product of a first unit time span and the numerical value; and performing communication on the carrier based on the resource units indicated by the resource scheduling information.

* * * * *